US011335956B2

(12) United States Patent
Oji et al.

(10) Patent No.: US 11,335,956 B2
(45) Date of Patent: May 17, 2022

(54) ENERGY STORAGE DEVICE AND METHOD OF MANUFACTURING ENERGY STORAGE DEVICE

(71) Applicant: GS Yuasa International Ltd., Kyoto (JP)

(72) Inventors: Katsuya Oji, Ritto (JP); Hisashi Ueda, Ritto (JP); Yoshio Yamane, Ritto (JP); Hiroaki Anbo, Ritto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 185 days.

(21) Appl. No.: 16/316,013

(22) PCT Filed: Jul. 10, 2017

(86) PCT No.: PCT/JP2017/025169
§ 371 (c)(1),
(2) Date: Jan. 7, 2019

(87) PCT Pub. No.: WO2018/012465
PCT Pub. Date: Jan. 18, 2018

(65) Prior Publication Data
US 2019/0260088 A1 Aug. 22, 2019

(30) Foreign Application Priority Data

Jul. 15, 2016 (JP) .............................. JP2016-140879

(51) Int. Cl.
*H01M 10/0587* (2010.01)
*H01G 11/26* (2013.01)
(Continued)

(52) U.S. Cl.
CPC ........ *H01M 10/0587* (2013.01); *H01G 9/048* (2013.01); *H01G 11/26* (2013.01);
(Continued)

(58) Field of Classification Search
CPC ........ H01G 13/02; H01G 11/70; H01G 11/74; H01G 11/26; H01G 11/86; H01G 11/82;
(Continued)

(56) References Cited

U.S. PATENT DOCUMENTS

2006/0207084 A1* 9/2006 Phillips ............... H01M 4/0404
29/623.1
2009/0169993 A1* 7/2009 Ohashi ............. H01M 10/0431
429/209

(Continued)

FOREIGN PATENT DOCUMENTS

CN 105378967 A 3/2016
JP 2008-078008 A 4/2008
(Continued)

OTHER PUBLICATIONS

International Search Report (ISR) (PCT Form PCT/ISA/210), in PCT/JP2017/025169, dated Oct. 10, 2017.

*Primary Examiner* — Jonathan G Jelsma
*Assistant Examiner* — Omar M Kekia
(74) *Attorney, Agent, or Firm* — McGinn IP Law Group, PLLC (57) ABSTRACT

An energy storage device includes an electrode assembly formed by winding a negative electrode plate, a separator and the like. An innermost periphery of the negative electrode plate, the separator and the like which are wound together has a flattened shape having a pair of bent portions disposed on opposite sides in a first direction as viewed in a direction of the winding axis, and an end edge of the negative electrode plate on an innermost periphery side is disposed at one bent portion out of the pair of bent portions or a position in the vicinity of the one bent portion.

12 Claims, 5 Drawing Sheets

(51) Int. Cl.
    *H01G 11/52*     (2013.01)
    *H01G 11/70*     (2013.01)
    *H01G 11/86*     (2013.01)
    *H01G 11/74*     (2013.01)
    *H01M 10/04*     (2006.01)
    *H01G 11/82*     (2013.01)
    *H01G 13/02*     (2006.01)
    *H01G 9/048*     (2006.01)
    *H01M 50/531*     (2021.01)
    *H01M 50/538*     (2021.01)

(52) U.S. Cl.
    CPC ............. *H01G 11/52* (2013.01); *H01G 11/70* (2013.01); *H01G 11/74* (2013.01); *H01G 11/82* (2013.01); *H01G 11/86* (2013.01); *H01G 13/02* (2013.01); *H01M 10/04* (2013.01); *H01M 50/531* (2021.01); *H01M 50/538* (2021.01); *Y02E 60/10* (2013.01)

(58) Field of Classification Search
    CPC ........ H01G 11/52; H01G 9/048; Y02E 60/10; H01M 10/04; H01M 10/0587; H01M 2/263; H01M 2/26; H01M 50/531; H01M 50/538

USPC .......................................................... 429/94
See application file for complete search history.

(56)     References Cited

U.S. PATENT DOCUMENTS

| | | |
|---|---|---|
| 2009/0202900 A1 | 8/2009 | Kuroda et al. |
| 2014/0072849 A1 | 3/2014 | Nitta et al. |
| 2016/0049685 A1* | 2/2016 | Sasaki ............... H01M 10/0431 |
| | | 429/94 |
| 2016/0155995 A1 | 6/2016 | Takahata |
| 2016/0344064 A1 | 11/2016 | Tanaka et al. |
| 2017/0125778 A1* | 5/2017 | Iwasa ................ H01M 10/0431 |

FOREIGN PATENT DOCUMENTS

| | | |
|---|---|---|
| JP | 2010-287513 A | 12/2010 |
| JP | 2013-246898 A | 12/2013 |
| JP | 2014-056742 A | 3/2014 |
| JP | 2016-042433 A | 3/2016 |
| JP | 2016-178095 A | 10/2016 |
| WO | WO 2015/129376 A1 | 9/2015 |

* cited by examiner

ENERGY STORAGE DEVICE AND METHOD OF MANUFACTURING ENERGY STORAGE DEVICE

TECHNICAL FIELD

The present invention relates to an energy storage device provided with an electrode assembly formed by winding plates and separators, and a method of manufacturing an energy storage device.

BACKGROUND ART

Conventionally, as a power source of an electric vehicle (EV), a plug-in hybrid electric vehicle (PHEV), a hybrid electric vehicle (HEV) or the like, an energy storage device such as a lithium ion secondary battery has been used. Such an energy storage device generally includes an electrode assembly, current collectors connected to the electrode assembly and the like.

An electrode assembly, which an energy storage device includes, is formed by winding a positive electrode plate, a negative electrode plate, and a separator, which are disposed in a layered manner such that the separator is sandwiched between the positive electrode plate and the negative electrode plate. For example, when a conductive foreign substance (contaminant) such as metal pieces or metal powders intrude into the inside of an electrode assembly having the structure where the positive electrode plate and the negative electrode plate opposedly face each other, a defect such as a minute short-circuiting or the like may occur. When a defect such as a minute short-circuiting occurs, a yield of energy storage devices is lowered.

In an energy storage device disclosed in Patent Document 1, for example, in a state where a portion of a positive electrode member including a coated portion is accommodated in a bag, which is formed by bonding end portions of two separators by thermal fusion bonding, the positive electrode member is stacked on a negative electrode member. Accordingly, it is possible to prevent a contaminant, which is generated when a metal layer of the negative electrode member is bonded to a current collector by ultrasonic bonding or the like, from intruding between two separators and being brought into contact with the positive electrode member.

PRIOR ART DOCUMENT

Patent Document

Patent Document 1: JP-A-2014-207205

SUMMARY OF THE INVENTION

Problems to be Solved by the Invention

In the above-mentioned conventional technique, however, in a step of manufacturing an electrode assembly for example, various operations are necessary for bonding the end portions of two separators by thermal fusion bonding. Such various operations become a cause which inhibits the enhancement of efficiency of manufacturing electrode assemblies.

The present invention has been made in view of the above-mentioned conventional drawbacks, and it is an object of the present invention to provide a highly reliable energy storage device including an electrode assembly which is formed by winding a plate and a separator, and a method of manufacturing the energy storage device.

Means for Solving the Problems

To achieve the above-mentioned object, an energy storage device according to an aspect of the present invention includes an electrode assembly formed by winding a plate and a separator around a winding axis, wherein an innermost periphery of the plate and the separator which are wound together has a flattened shape having a pair of bent portions disposed on opposite sides in a first direction as viewed in a direction of the winding axis, and an end edge of the plate on an innermost peripheral side is disposed at one bent portion of the pair of bent portions or a position in the vicinity of the one bent portion.

Further, an energy storage device according to another aspect of the present invention includes an electrode assembly formed by winding a plate and a separator around a winding axis, and a current collector which is bonded to the electrode assembly, wherein an innermost periphery of the plate and the separator which are wound together has a flattened shape having a pair of bent portions disposed on opposite sides in a first direction as viewed in a direction of the winding axis, and the electrode assembly has a bonding portion which forms a portion to be bonded to the current collector, and an end edge of the plate on an innermost peripheral side is disposed between the bonding portion and a top of one bent portion of the pair of bent portions in the first direction.

Advantages of the Invention

According to the present invention, it is possible to provide a highly reliable energy storage device including an electrode assembly formed by winding a plate and a separator together, and a method of manufacturing the energy storage device.

MODE FOR CARRYING OUT THE INVENTION

Inventors of the present invention have studied a possibility of occurrence of the following problems relating to the above-mentioned related art. For example, in the case where end portions of two separators are bonded to each other, an end portion of one of two separators is confined by an end portion of the other separator. When an electrode assembly is manufactured in a state where two separators confine each other, there may be a case where the electrode assembly is distorted. As a result, there is a possibility that displacement occurs in a portion of an end portion of the electrode assembly where an active-material non-coated portion of a positive electrode plate or a negative electrode plate is stacked, for example. Such a phenomenon may lower a bonding strength or bonding accuracy between the end portion and a current collector, for example.

The present invention has been made in view of the above-mentioned drawback, and it is an object of the present invention to provide a highly reliable energy storage device which includes an electrode assembly formed by winding a plate and a separator, and a method of manufacturing such an energy storage device.

To achieve the above-mentioned object, an energy storage device according to an aspect of the present invention includes an electrode assembly formed by winding a plate and a separator around a winding axis, wherein an innermost periphery of the plate and the separator which are wound together has a flattened shape having a pair of bent portions disposed on opposite sides in a first direction as viewed in a direction of the winding axis, and an end edge of the plate on an innermost peripheral side is disposed at one bent portion of the pair of bent portions or a position in the vicinity of the one bent portion.

With such a configuration, a portion (end portion) which includes a winding start end edge of the plate pushes the separator disposed outside the portion outward. Accordingly, for example, it is possible to suppress the occurrence of floating (the formation of a wrinkle) of the separator outside the end portion of the plate by the end portion of the plate. That is, floating of the separator outside the end portion of the plate can be suppressed. As a result, it is possible to acquire an advantageous effect that the intrusion of a contaminant into the inside of the electrode assembly is suppressed. Further, such an advantageous effect can be acquired by devising the winding start position of the plate and hence, an operation such as a thermal bonding of end portions of the separators disposed adjacently to each other described in the above-mentioned prior art becomes unnecessary. Further, additional members for acquiring such an advantageous effect become unnecessary.

In this manner, the energy storage device according to this aspect is a highly reliable energy storage device which includes an electrode assembly formed by winding a plate and a separator.

In the energy storage device according to one aspect of the present invention, assuming that a distance from the winding axis to a top of the bent portion in the first direction is L, the end edge of the plate may be disposed within a range of L/4 from the top in the first direction.

With such a configuration, for example, the position of the end edge of the plate at the bent portion or at area in the vicinity of the bent portion is set within the range of L/4 from the top of the bent portion. That is, by positioning the winding start end edge of the plate within this range, In the energy storage device according to one aspect of the present invention, the energy storage device may further include a current collector having a leg portion, wherein the electrode assembly may have a bonding portion which is a portion to be bonded to the leg portion, and the end edge of the plate may be disposed at a position closer to a top of the bent portion than the bonding portion in the first direction.

With such a configuration, a bonding operation such as welding or swaging performed in manufacturing steps of the energy storage device is performed in a state where the end portion of the plate is pressed toward the outside by a jig. Accordingly, even when a contaminant is generated in the bonding operation, it is possible to suppress the intrusion of the contaminant into the inside of the electrode assembly.

In the energy storage device according to one aspect of the present invention, the electrode assembly may further have a core member disposed in contact with the innermost periphery and having a flattened shape.

With such a configuration, the winding start end edge of the plate is pressed toward the outside by the core member positioned inside the innermost periphery. Accordingly, it is possible to suppress with more certainty floating of the separator outside the end portion including the end edge. As a result, it is possible to suppress with more certainty the intrusion of a contaminant into the inside of the electrode assembly.

In the energy storage device according to one aspect of the present invention, the plate may be a negative electrode plate, the electrode assembly may further include a positive electrode plate wound together with the negative electrode plate and the separator, assuming that a distance from the winding axis to a top of the bent portion in the first direction is L, the end edge of the negative electrode plate may be disposed at a position closer to a top of the bent portion in the first direction than an end edge of the positive electrode plate on the innermost peripheral side, and a distance between the end edge of the negative electrode plate and the end edge of the positive electrode plate may be set to L/2 or more.

With such a configuration, the distance between the winding start end edge of the negative electrode plate and the winding start end edge of the positive electrode plate is relatively long. Accordingly, even when floating of the separator occurs outside the end portion of the negative electrode plate and a contaminant intrudes through the portion where the floating occurs, the contaminant minimally reaches the positive electrode plate.

A method of manufacturing an energy storage device according to one aspect of the present invention includes: an electrode assembly formed by winding a plate and a separator around a winding axis; and a current collector bonded to the electrode assembly, the method including: a winding step of winding the plate and the separator; and a bonding step of bonding the electrode assembly and the current collector to each other while pressing an end portion of the plate on an innermost peripheral side of the wound plates and separator by a jig from an innermost peripheral side.

In such a manufacturing method, a bonding operation such as welding or swaging is performed in a state where the end portion of the plate is pressed toward the outside by the jig. That is, the electrode assembly is bonded to the current collector in a state where floating of the separator disposed outside the end portion of the plate is suppressed. Accordingly, even when a contaminant is generated in the bonding operation, a possibility is low that the contaminant intrudes into the inside of the electrode assembly. In this manner, according to the method of manufacturing an energy storage device of this aspect, it is possible to manufacture a highly reliable energy storage device including an electrode assembly which is formed by winding plates and a separator An energy storage device according to an aspect of the present invention includes: an electrode assembly formed by winding a plate and a separator around a winding axis; and a current collector which is bonded to the electrode assembly, wherein an innermost periphery of the plate and the separator which are wound together has a flattened shape having a pair of bent portions disposed on opposite sides in a first direction as viewed in a direction of the winding axis, and the electrode assembly has a bonding portion which forms a portion to be bonded to the current collector, and an end edge of the plate on an innermost peripheral side is disposed between the bonding portion and a top of one bent portion of the pair of bent portions in the first direction.

With such a configuration, the position of the end edge of the plate on an innermost peripheral side in the winding type electrode assembly is disposed at the position spaced apart from the bonding portion in the first direction. That is, the position of the end edge of the plate which is the position where floating of the separator is liable to occur and the position of the bonding portion where a contaminant is liable to be generated are displaced from each other in the first direction. As a result, even when floating of the separator occurs in the vicinity of the end edge of the plate, it is possible to reduce a possibility that a contaminant intrudes from the portion where the floating occurs. In this manner, it is possible to acquire a highly reliable energy storage device by defining the position of the end edge of the plate on the innermost peripheral side in view of the relationship with the position of the bonding portion.

The energy storage device according to this aspect of the present invention may further include an electrode terminal, and the current collector may include: a terminal connecting portion to be connected to the electrode terminal; and a leg portion extending from the terminal connecting portion and connected to the bonding portion of the electrode assembly, and an end edge of the plate on the innermost peripheral side may be disposed between the bonding portion and a top of a bent portion on a terminal connecting portion side of the pair of bent portion.

In general, the energy storage device takes a posture where a side on which the electrode terminal is disposed is directed upward at the time of manufacturing and using the energy storage device in many cases. When the energy storage device takes such a posture, according to the above-mentioned configuration, the end edge of the plate on an innermost peripheral side is positioned above the bonding portion. That is, even when floating of the separator occurs in the vicinity of the end edge of the plate, the position is above the bonding portion where a contaminant is liable to be generated. As a result, according to the energy storage device of this aspect, it is possible to reduce a possibility that a contaminant intrudes into the inside of the electrode assembly.

In the energy storage device according to an aspect of the present invention, a projecting distance which is a distance from a portion of the plate bonded to the current collector at the bonding portion to the end edge may be set to 2 mm or more.

With such a configuration, for example, the end edge of the plate on an innermost peripheral side is disposed at the position upwardly spaced apart from the bonding portion by 2 mm or more. That is, by positioning the winding start end edge of the plate within such a range, it is possible to acquire with more certainty an advantageous effect of suppressing intrusion of a contaminant in the vicinity of the end edge.

Hereinafter, an energy storage device according to an embodiment of the present invention is described with reference to drawings. The respective drawings are schematic views, and respective constitutional elements are not always described strictly accurately in size or the like.

Further, the embodiment described hereinafter shows one specific example of the present invention. In the embodiment described hereinafter, shapes, materials, constitutional elements, the arrangement positions and connection states of the constitutional elements, the order of manufacturing steps and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements.

Figure 1:
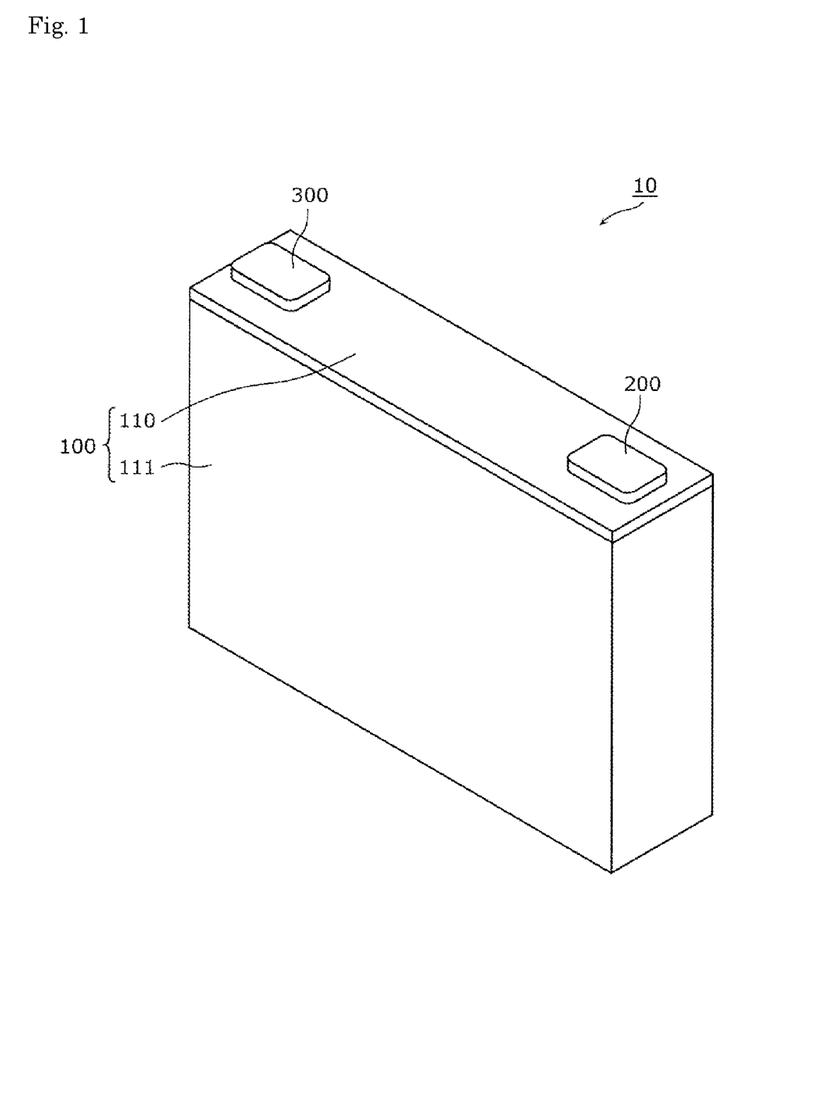
FIG. 1 is a perspective view showing an external appearance of an energy storage device according to an embodiment.
Figures 2, 3:
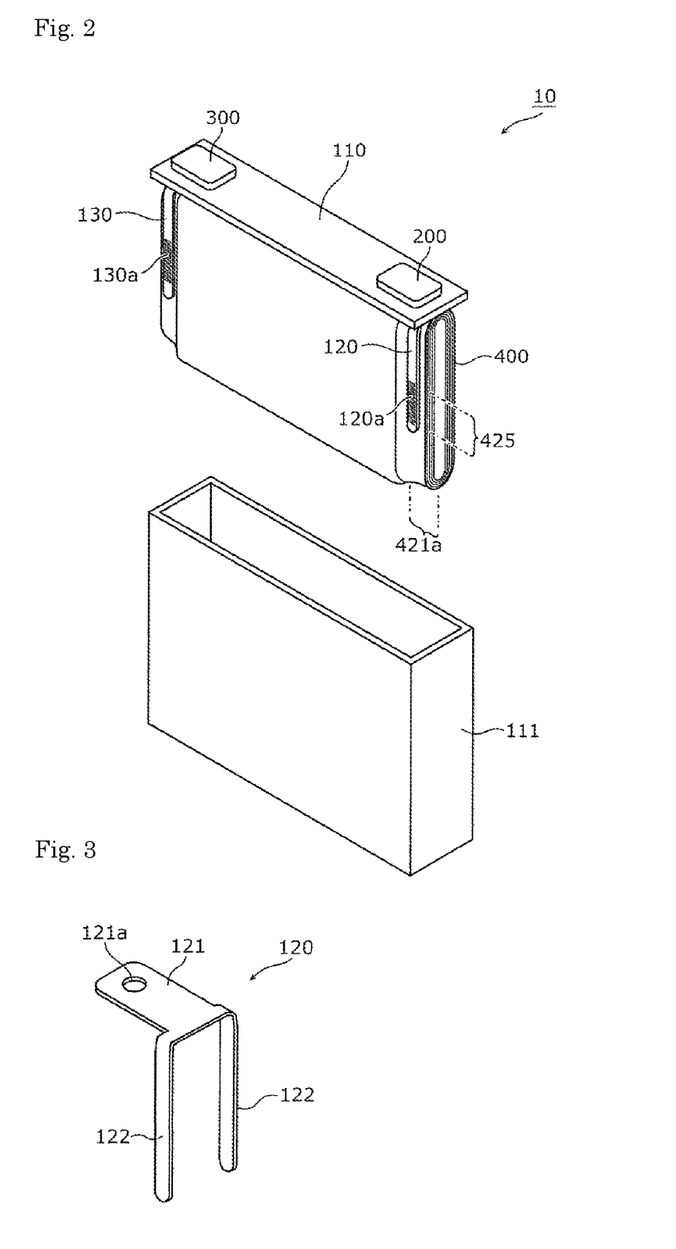
FIG. 2 is a perspective view showing constitutional elements disposed in the inside of a case of the energy storage device according to the embodiment.
FIG. 3 is a perspective view showing an external appearance of a current collector according to the embodiment.

First, with reference to FIG. 1 to FIG. 3, an overall configuration of an energy storage device 10 according to the embodiment is described.

FIG. 1 is a perspective view showing an external appearance of the energy storage device 10 according to the embodiment. FIG. 2 is a perspective view showing constitutional elements disposed in the inside of a case 100 of the energy storage device 10 according to the embodiment. To be more specific, FIG. 2 is a perspective view showing the energy storage device 10 in a state where a lid body 110 and a body 111 of the case 100 are separated from each other. FIG. 3 is a perspective view showing an external appearance of a current collector 120 according to the embodiment.

The energy storage device 10 is a secondary battery which can charge electricity and discharge electricity. To be more specific, the energy storage device 10 is a nonaqueous electrolyte secondary battery such as a lithium ion secondary battery. For example, the energy storage device 10 is applicable to various automobiles such as an electric vehicle (EV), a hybrid electric vehicle (HEV), a plug-in hybrid electric vehicle (PHEV) or the like. The energy storage device 10 is not limited to a nonaqueous electrolyte secondary battery, and may be a secondary battery other than a nonaqueous electrolyte secondary battery, or may be a capacitor. Further, the energy storage device 10 may be a primary battery where a user can use stored electricity without charging.

As shown in FIG. 1, the energy storage device 10 includes the case 100, a negative electrode terminal 200, and a positive electrode terminal 300. Further, as shown in FIG. 2, a negative electrode side current collector 120, a positive electrode side current collector 130, and an electrode assembly 400 are accommodated in the inside of the case 100.

The energy storage device 10 may include, in addition to the above-mentioned constitutional elements, spacers respectively disposed on the side of the current collectors 120, 130, a gas release valve for releasing a pressure when an internal pressure of the case 100 is increased, an insulation film which wraps the electrode assembly 400 and the like. Further, although a liquid such as an electrolyte solution (nonaqueous electrolyte) or the like can be sealed in the inside of the case 100 of the energy storage device 10, the illustration of the liquid is omitted. As an electrolyte solution sealed in the case 100, a kind of the electrolyte solution is not particularly limited and various kinds of electrolyte solutions can be selected provided that performance of the energy storage device 10 is not impaired.

The case 100 is constituted of a bottomed body 111 having a rectangular cylindrical shape, and a lid body 110 formed of a plate-like member which closes an opening of the body 111. Further, the case 100 has the structure where the inside of the case 100 is hermetically sealed by joining the lid body 110 and the body 111 to each other by welding or the like after the electrode assembly 400 and the like are accommodated in the inside of the case 100. Although a material for forming the lid body 110 and a material for forming the body 111 are not particularly limited, for example, weldable metal such as stainless steel, aluminum, or an aluminum alloy is preferably used.

The electrode assembly 400 is a member including a positive electrode plate, a negative electrode plate, and separators, and is capable of storing electricity. The configuration of the electrode assembly 400 is described in detail later with reference to FIG. 4 and the like.

The negative electrode terminal 200 is an electrode terminal which is electrically connected to a negative electrode of the electrode assembly 400 through the current collector 120. The positive electrode terminal 300 is an electrode terminal which is electrically connected to a positive electrode of the electrode assembly 400 through the current collector 130. The negative electrode terminal 200 and the positive electrode terminal 300 are mounted on the lid body 110 disposed above the electrode assembly 400 by way of a gasket (not shown in the drawing) having insulation property.

The current collector 120 is a member having conductivity and rigidity which is disposed between the negative electrode of the electrode assembly 400 and a wall surface of the body 111 of the case 100, and is electrically connected to the negative electrode terminal 200 and the negative electrode of the electrode assembly 400.

The current collector 130 is a member having conductivity and rigidity which is disposed between the positive electrode of the electrode assembly 400 and the wall surface of the body 111 of the case 100, and is electrically connected to the positive electrode terminal 300 and the positive electrode of the electrode assembly 400.

To be more specific, the current collectors 120, 130 are fixed to the lid body 110. Further, the current collector 120 is bonded to a negative electrode side end portion of the electrode assembly 400, and the current collector 130 is bonded to a positive electrode side end portion of the electrode assembly 400. The electrode assembly 400 is held in a state where the electrode assembly 400 is suspended from the lid body 110 by the current collectors 120, 130 in the inside of the case 100.

In this embodiment, the current collectors 120, 130 are respectively bonded to the electrode assembly 400 by ultrasonic bonding. Accordingly, as shown in FIG. 1, welded marks 120a are formed on the current collector 120, and welded marks 130a are formed on the current collector 130.

In this embodiment, shapes, the mounting structures and the like of the current collector 120 and the current collector 130 are substantially equal to each other. Accordingly, in the description made hereinafter, matters relating to the negative electrode side current collector 120 and the surrounding of the current collector 120 are mainly described, and the description with respect to matters relating to members on the positive electrode side current collector 130 side is omitted when appropriate.

As shown in FIG. 3, the current collector 120 according to this embodiment has leg portions 122 to be bonded to the electrode assembly 400. To be more specific, the current collector 120 has a pair of leg portions 122 which is disposed so as to sandwich the negative electrode side end portion of the electrode assembly 400 from both sides. Each of the pair of leg portions 122 is an elongated portion extended from an end portion of a terminal connecting portion 121 which the current collector 120 has. The terminal connecting portion 121 is a portion to be connected to the negative electrode terminal 200. For example, by swaging a rivet mounted on the negative electrode terminal 200 in a state where the rivet passes through a through hole 121a of the terminal connecting portion 121, the negative electrode terminal 200 and the current collector 120 are connected to each other. Further, the pair of leg portions 122 are bonded to the negative electrode side end portion of the electrode assembly 400. With such a configuration, the current collector 120 is electrically connected to the negative electrode of the electrode assembly 400.

The negative electrode side end portion of the electrode assembly 400 is formed of a layer made of metal foil (active material non-coated portion 421a) where the negative electrode plate which the electrode assembly 400 has is exposed. Further, the electrode assembly 400 has a bonding portion 425 (see FIG. 2) which forms a portion bonded to the leg portion 122 of the current collector 120. To be more specific, the electrode assembly 400 has the bonding portion 425 at positions respectively corresponding to the pair of leg portions 122 of the current collector 120. The bonding portion 425 is a part of the electrode assembly 400, and is a portion oppositely facing a bonded mark (welded mark 120a in this embodiment) in the current collector 120, for example.

Figure 4:
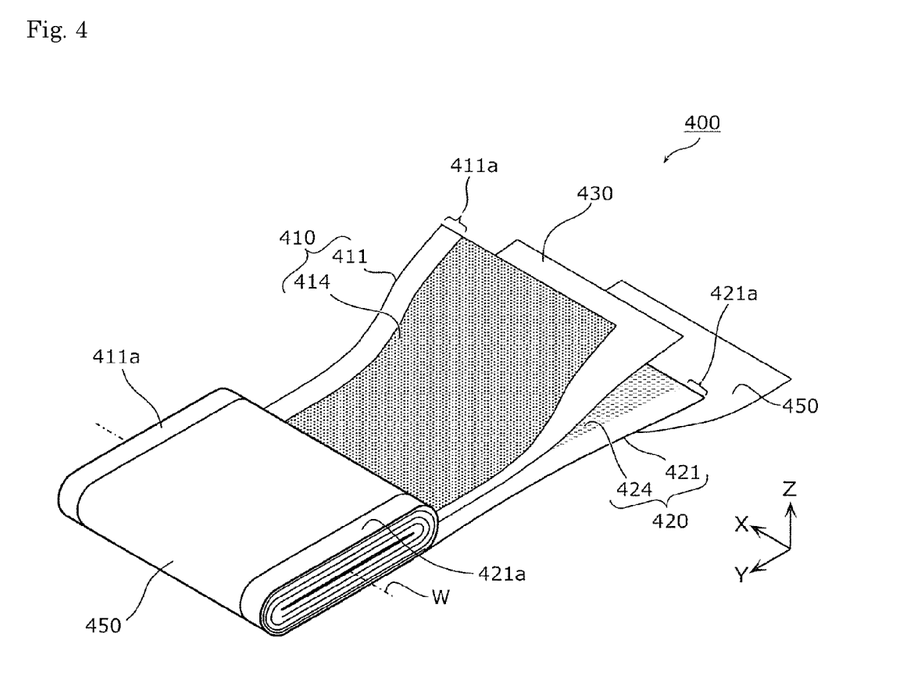
FIG. 4 is a perspective view showing a schematic configuration of the electrode assembly according to the embodiment.

Next, the configuration of the electrode assembly 400 which the energy storage device 10 includes is described with reference to FIG. 4. FIG. 4 is a perspective view showing constitutional elements of the electrode assembly 400 according to the embodiment. In FIG. 4, elements such as plates which are wound in a stacked manner are shown in a partially developed manner. Further, in FIG. 4, a dotted chain line to which symbol W is given shows a winding axis of the electrode assembly 400. The winding axis W is an imaginary axis which becomes a center axis at the time of winding the plates and the like, and in this embodiment, the winding axis W is a straight line passing the center of the electrode assembly 400 and parallel to the X axis. That is, in this embodiment, "direction of winding axis W" is equal to "X axis direction."

The electrode assembly 400 is one example of an electrode assembly which is formed by winding the plates and the separators around the winding axis W. In this embodiment, as shown in FIG. 4, the electrode assembly 400 is formed by stacking a separator 450, a negative electrode plate 420, a separator 430, and a positive electrode plate 410 in this order and by winding these elements together. Further, as shown in FIG. 4, the electrode assembly 400 has a flattened shape flattened in a direction (Z axis direction in this embodiment) orthogonal to the winding axis W. That is, the electrode assembly 400 has an elongated circular shape as a whole as viewed in the direction of the winding axis W, and straight line portions of the elongated circular shape have a flat shape, and bent portions of the elongated circular shape have a bent shape. Accordingly, the electrode assembly 400 has a pair of bent portions which opposedly faces each other (portions opposely face each other in a Y axis direction with the winding axis W sandwiched therebetween), and a pair of intermediate portions which forms portions between the pair of bent portions (portions opposedly face each other in the Z axis direction with the winding axis W sandwiched therebetween).

In this embodiment, the positive electrode plate 410 is formed by forming a positive electrode composite material layer 414 including a positive active material on a surface of a metal foil (positive electrode substrate layer 411) having an elongated strip shape made of aluminum. The negative electrode plate 420 is formed by forming a negative electrode composite material layer 424 including a negative active material on a surface of a metal foil (negative electrode base material layer 421) having an elongated strip shape made of copper. Examples of the positive active material and the negative active material are described later.

Further, in this embodiment, the separators 430, 450 each have a microporous sheet made of a resin as a substrate.

In the electrode assembly 400 having the above-mentioned configuration, to be more specific, the positive electrode plate 410 and the negative electrode plate 420 are wound with the separator 430 or 450 interposed therebetween in a displaced manner in the direction of the winding axis W. Further, the positive electrode plate 410 and the negative electrode plate 420 have an active material non-coated portion which is a portion of the substrate layer where an active material is not applied by coating on end portions thereof which are displaced from each other in the above-mentioned direction respectively.

To be more specific, the positive electrode plate 410 has an active material non-coated portion 411*a* where a positive active material is not applied by coating on one end in the direction of the winding axis W (an end portion on a plus side in the X axis direction in FIG. 4). The negative electrode plate 420 has an active material non-coated portion 421*a* where a negative active material is not applied by coating on the other end in the direction of the winding axis W (an end portion on a minus side in the X axis direction in FIG. 4).

That is, the positive electrode side end portion is formed of a layer of a metal foil (active material non-coated portion 411*a*) where the positive electrode plate 410 is exposed, and the negative electrode side end portion is formed of a layer of a metal foil (active material non-coated portion 421*a*) where the negative electrode plate 420 is exposed. The positive electrode side end portion is bonded to the current collector 130, and the negative electrode side end portion is bonded to the current collector 120. In this embodiment, as a method of such bonding, as described above, ultrasonic bonding is adopted. As a method of bonding between the electrode assembly 400 and the current collectors 120, 130, a method such as a resistance welding, a clinching or the like may be adopted besides the ultrasonic bonding.

In the electrode assembly 400 having the above-mentioned configuration, a winding start end edge of the electrode plate (negative electrode plate 420 in this embodiment) is positioned at the bent portion in the innermost periphery or at an area in the vicinity of the bent portion. Accordingly, in the electrode assembly 400, floating of the separator outside an end portion including the end edge. This structure is described hereinafter with reference to FIG. 5 to FIG. 7.

Figure 5:
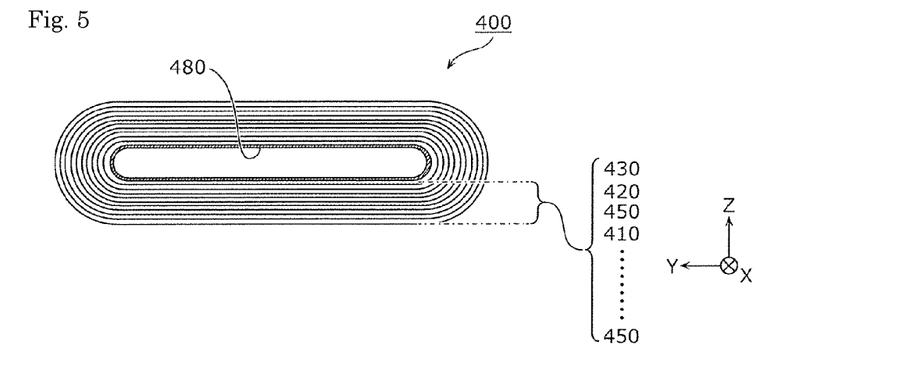
FIG. 5 is a view showing a schematic configuration of the electrode assembly according to the embodiment as viewed in a direction of the winding axis.
Figure 6:
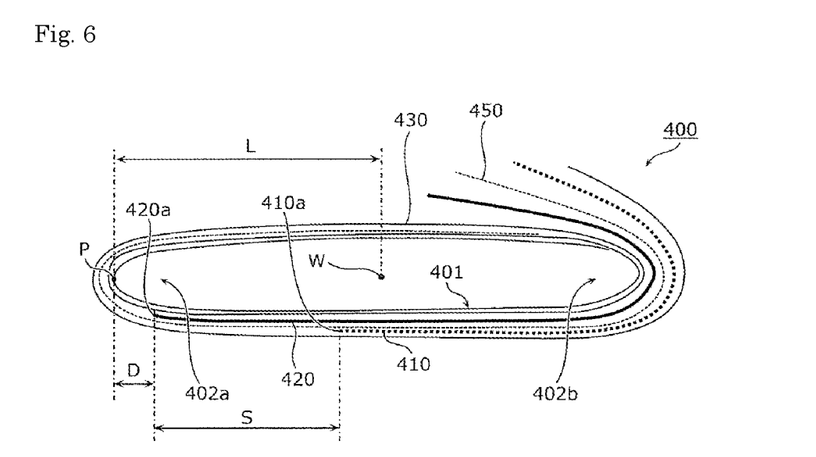
FIG. 6 is a view showing one example of a winding start position of a negative electrode plate in the electrode assembly according to the embodiment.
Figure 7:
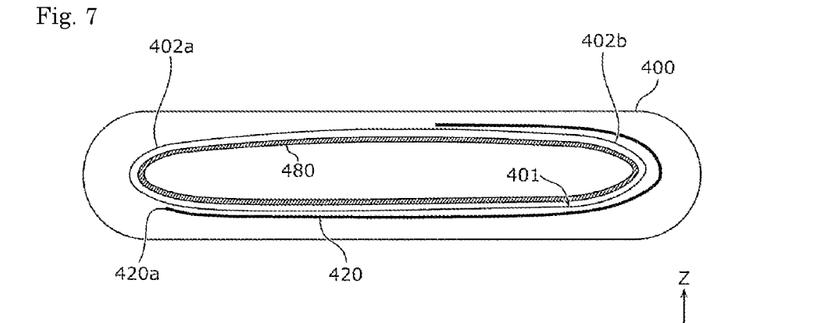
FIG. 7 is a view showing an arrangement position of a core member of the electrode assembly according to the embodiment.

FIG. 5 is a view showing the schematic configuration of the electrode assembly 400 according to this embodiment as viewed in the direction of the winding axis W. FIG. 6 is a view showing one example of a winding start position of the negative electrode plate 420 in the electrode assembly 400 according to this embodiment. FIG. 7 is a view showing an arrangement position of a core member 480 in the electrode assembly 400 according to this embodiment. In FIG. 6, the illustration of the core member 480 is omitted. In FIG. 7, with respect to the negative electrode plate 420, only a portion of a winding start including an end edge 420*a* is shown, and the illustration of the separators (430, 450) and the positive electrode plate 410 is omitted.

As shown in FIG. 5, the electrode assembly 400 has a flattened circular shape flattened in the Z axis direction as viewed in the direction of the winding axis W. Such a shape is formed by compressing the electrode assembly 400 in the Z axis direction after the elements (hereinafter also referred to as "electrode assembly elements") which constitute the electrode assembly 400 such as the negative electrode plate 420 and the like are wound together. Further, in this embodiment, the electrode assembly 400 has the core member 480, and also the core member 480 has a flattened shape flattened in the Z axis direction.

The core member 480 is an insulating member disposed inside the innermost periphery 401 of the wound electrode assembly elements. To be more specific, the core member 480 is a winding core made of a resin such as polypropylene or polyethylene. That is, the electrode assembly 400 is formed by winding the separator 430, the negative electrode plate 420, the separator 450, and the positive electrode plate 410 which constitute the electrode assembly elements around the core member 480.

The core member 480 may be a wound sheet ring which is formed by winding a resin sheet, or may be a member molded into a flattened shape. Further, the core member 480 may be a member formed integrally, or may be formed of a plurality of members. A material for forming the core member 480 is not particularly limited. For example, when a separator is disposed at a position closest to the core member 480 and when a potential of one of the positive electrode or the negative electrode is lowered to a potential of the core member 480, a conductive material may be used. Further, the core member 480 is not an essential element to the electrode assembly 400, and the electrode assembly 400 may be formed by winding the electrode assembly elements such as the separator 430, the negative electrode plate 420 and the like without using the core member 480.

In this manner, the innermost periphery 401 of the electrode assembly elements such as the negative electrode plate 420 and the like which are wound around the core member 480 has a flattened shape flattened in the Z axis direction (for example, a shape formed by compressing a circular shape in the Z axis direction) in the same manner as the electrode assembly 400. In this embodiment, as shown in FIG. 6, the innermost periphery 401 of the electrode assembly 400 is formed of an inner surface of the separator 430 wound by at least one turn.

To be more specific, the innermost periphery 401 of the wound plates (410, 420) and the separators (430, 450) has a flattened shape having a pair of bent portions 402*a*, 402*b* which opposely faces each other in the first direction as viewed in the direction of the winding axis W. In this embodiment, the direction of the winding axis W is the X axis direction, the first direction is the Y axis direction.

Further, an end edge 420*a* on an innermost periphery 401 side of the negative electrode plate 420, that is, a winding start end edge 420*a* of the negative electrode plate 420 is disposed at the bent portion 402*a* or a position in the vicinity of the bent portion 402*a*. In other words, the end edge 420*a* of the negative electrode plate 420 is disposed at the bent portion 402a or an end portion of an intermediate portion (portion between the pair of bent portions (402a, 402b)) in a longitudinal direction.

Here, the bent portions (402a, 402b) in the innermost periphery 401 and the electrode assembly elements positioned outside the bent portions (402a, 402b) are portions which are bent in a folded back manner, and are portions where, when being wound, a relatively large force is applied in a direction away from the winding axis W. In other words, these portions are portions where electrode assembly elements disposed adjacently to each other such as the separator 430 and the negative electrode plate 420 are easily brought into close contact with each other.

Accordingly, the winding start end edge 420a of the negative electrode plate 420 is disposed at the bent portion 402a or a position in the vicinity of the bent portion 402a and hence, for example, a portion including the end edge 420a (the end portion of the negative electrode plate 420) pushes the separator 450 disposed outside the end portion outward. With such a configuration, floating of the separator 450 outside the end portion of the negative electrode plate 420 (occurrence of wrinkles) can be suppressed. That is, generation of a gap between the separator 450 and the separator 430 outside the end portion of the negative electrode plate 420 can be suppressed. As a result, generation of a gap in the vicinity of the end edge 410a of the positive electrode plate 410 can be suppressed. Accordingly, intrusion of the contaminant into the inside of the electrode assembly 400 can be suppressed, as a result, for example, a possibility that the contaminant is brought into contact with the positive electrode plate 410 is reduced. That is, occurrence of defect (internal short-circuiting or the like) due to the contact of the contaminant with the positive electrode plate 410 can be suppressed.

Further, as described above, the electrode assembly 400 is compressed in the Z axis direction in the manufacturing process, the compressive force at this time acts on the electrode assembly 400 so as to move the bent portions (402a, 402b) of the innermost periphery 401 outward. In this case, the end portion of the negative electrode plate 420 is pressed outward by the separator 430 on an inner side of the end portion. Also due to such an operation, floating of the separator 450 outside the end portion of the negative electrode plate 420 can be suppressed whereby intrusion of the contaminant into the inside of the electrode assembly 400 can be suppressed.

In this embodiment, the above-mentioned effect of suppressing the intrusion of the contaminant into the inside of the electrode assembly 400 can be acquired by devising a winding start position of the negative electrode plate 420. Accordingly, a cumbersome operation such as a closing operation by welding end edges of separators disposed adjacently to each other is unnecessary. Further, another member for acquiring the above-mentioned effect is also unnecessary.

In this manner, the energy storage device 10 according to this embodiment includes the electrode assembly 400, and with respect to the electrode assembly 400, the intrusion of the contaminant into the inside of the electrode assembly 400 is suppressed by devising the structure. Accordingly, the energy storage device 10 is a highly reliable energy storage device.

In this embodiment, assume a distance from the winding axis W to a top P of the bent portion 402a in the Y axis direction (a farthest point of the bent portion 402a from the winding axis W in the Y axis direction) as L, the end edge 420a of the negative electrode plate 420 is disposed within a range of from the top P to a point of L/4 in the Y axis direction. That is, assume a distance from the top P of the bent portion 402a to the end edge 420a of the negative electrode plate 420 as D, the relationship of D≤L/4 is established.

As described above, in this embodiment, the bent portion 402a or a position in the vicinity of the bent portion 402a is defined within a range of from the top P of the bent portion 402a to the point of L/4. That is, the winding start end edge 420a of the negative electrode plate 420 falls within such a range and hence, it is possible to acquire an effect of suppressing floating of the separator 450 outside an end portion including the end edge 420a with more certainty.

To be more specific, the inventors of the present invention have carried out a verification experiment for verifying an effect of suppressing the intrusion of a contaminant (a copper piece) into the inside of an electrode assembly with respect to energy storage devices which differ from each other in the position of the end edge 420a of the negative electrode plate 420.

To be more specific, the verification experiment were made with respect to three cases consisting of a case (a) where a position of the end edge 420a of the negative electrode plate 420 agrees with the winding axis W in the Y axis direction, a case (b) where a position of the end edge 420a of the negative electrode plate 420 is away from the winding axis W by a distance L1 in a direction approaching the top P of the bent portion 402a in the Y axis direction, and a case (c) where a position of the end edge 420a of the negative electrode plate 420 is away from the winding axis W by a distance L2 (>L1) in a direction approaching the top P of the bent portion 402a in the Y axis direction.

Further, in this verification experiment, a plurality of contaminants (small copper pieces) were sealed in the case 100, and such a case 100 was left for a predetermined period of time in a posture where the negative electrode side end portion of the electrode assembly 400 is directed upward. Then, the energy storage device was disassembled, and the number of contaminants intruded into the inside of the electrode assembly 400 at a position close to the innermost periphery 401 was measured.

As a result of the above-mentioned verification experiment, the number of measured contaminants becomes largest in the case (a), and the number of contaminants is decreased in order from the case (b) and the case (c). This is because, as described above, it is considered that the closer the end edge 420a of the negative electrode plate 420 is to the top P of the bent portion (in this embodiment, the bent portion 402a) of the innermost periphery 401, the larger an effect of pressing the end edge 420a outward becomes.

Based on the result of the above-mentioned verification experiment and the like, the inventors of the present invention concluded that since the end edge 420a of the negative electrode plate 420 is disposed within a range of from the top P to the position of L/4 in the Y axis direction, it is possible to substantially acquire the effect of suppressing the intrusion of a contaminant into the inside of the electrode assembly 400.

Here, it is preferable that a position of the end edge 420a of the negative electrode plate 420 in the Y axis direction fall within a range of from the top P of the bent portion 402a to a position of L/6.

Further, in this embodiment, the core member 480 which the electrode assembly 400 has contributes to the enhancement of an effect of suppressing the intrusion of the contaminant into the inside of the electrode assembly 400.

To be more specific, in this embodiment, for example, as shown in FIG. 7, the electrode assembly 400 has the core member 480 having a flattened shape disposed so as to be brought into contact with the innermost periphery 401. In FIG. 7, to make a positional relationship between the innermost periphery 401 and the core member 480 in the electrode assembly 400 clear, the core member 480 and the innermost periphery 401 are shown in such a manner that a gap is formed therebetween. However, in an actual configuration, the core member 480 is disposed in a sandwiched manner between the bent portions 402a, 402b in the innermost periphery 401, and the core member 480 is in a state where the core member 480 is brought into contact with the innermost periphery 401 over the whole region of the outer periphery thereof.

In this manner, in a case where, in the electrode assembly 400, the core member 480 is disposed inside the innermost periphery 401, the core member 480 also functions as a member for pressing the winding start end edge 420a of the negative electrode plate 420 outward. This function becomes conspicuous when the electrode assembly 400 is compressed in the Z axis direction in order to adjust the shape of the electrode assembly 400, for example. Accordingly, floating of the separator 450 outside the end edge 420a is suppressed with more certainty. As a result, the intrusion of the contaminant into the inside of the electrode assembly 400 can be suppressed with more certainty.

Here, for example, when the end portion (negative electrode side end portion or positive electrode side end portion) of the electrode assembly and the current collector are bonded to each other in a state where the opening of the end portion is closed or when the core member is a solid body so that the core member is hard, it is safe to say that a problem such as floating of the separator in the vicinity of the edge of the plate on an innermost peripheral side minimally occurs. Accordingly, the configuration of the electrode assembly 400 according to this embodiment is useful to the winding type electrode assembly having a cavity opening outward at the winding center.

In the electrode assembly 400 according to this embodiment, as shown in FIG. 6, the end edge 420a of the negative electrode plate 420 is disposed at the position closer to the top P of the bent portion 402a in the Y axis direction than the end edge 410a of the positive electrode plate 410 on an innermost periphery 401 side. Further, a distance S between the end edge 420a of the negative electrode plate 420 and the end edge 410a of the positive electrode plate 410 is equal to or more than L/2.

According to such a construction, a distance between the winding start end edge 420a of the negative electrode plate 420 and the winding start end edge 410a of the positive electrode plate 410 is relatively long. Accordingly, even when a gap is formed between the separators 450, 430 disposed outside the end portion of the negative electrode plate 420, and a contaminant intrudes into the gap, the contaminant minimally reaches the positive electrode plate 410. That is, the occurrence of a defect (internal short-circuiting or the like) caused by contact of the contaminant with the positive electrode plate 410 is suppressed.

The electrode assembly 400 having the above-mentioned configuration is bonded to the current collectors 120, 130 as described above, the bonding operation is carried out while pressing a portion of the electrode assembly 400 by a jig. The matter relating to the bonding operation is described with reference to FIG. 8.

Figure 8:
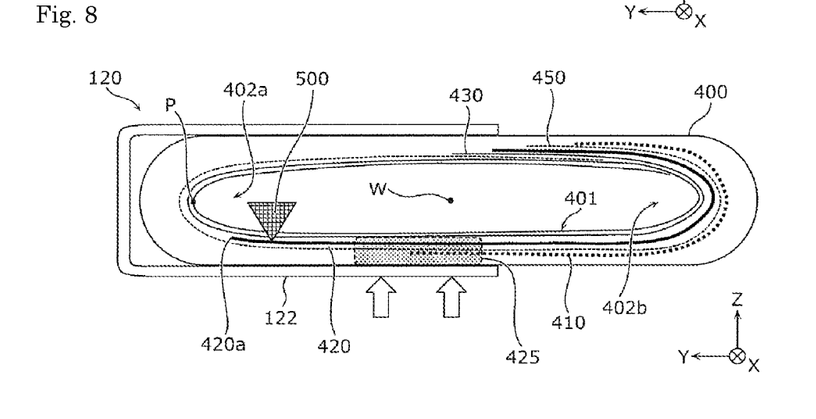
FIG. 8 is a view schematically showing a bonding operation between the electrode assembly and the current collector according to the embodiment.

FIG. 8 is a view schematically showing the bonding operation between the electrode assembly 400 and the current collector 120 according to the embodiment. As shown in FIG. 8, the energy storage device 10 according to this embodiment includes the current collector 120 having the leg portions 122, and the electrode assembly 400 has the bonding portion 425 which is a portion to be bonded to the leg portions 122. To be more specific, the bonding portion 425 is formed by the end of the negative electrode plate 420 included in the shaded portion shown in FIG. 8 (stacked portion of the active material non-coated portion 421a). In this manner, in the electrode assembly 400 which is bonded to the current collector 120, the end edge 420a of the negative electrode plate 420 is disposed at a position closer to the top P of the bent portion 402a than the bonding portion 425 in the Y axis direction.

With such a configuration, the bonding operation using ultrasonic bonding in this embodiment can be performed in a state where, as shown in FIG. 8, the end portion of the negative electrode plate 420 is pressed outward by a jig 500 (downward in FIG. 8). In other words, since the winding start end edge 420a of the negative electrode plate 420 is disposed at the bent portion 402a or the position in the vicinity of the bent portion 402a, it is possible to perform the bonding operation between the electrode assembly 400 and the current collector 120 while pressing the end portion including the end edge 420a of the negative electrode plate 420 using the jig 500. That is, the method of manufacturing the energy storage device 10 according to this embodiment is described as follows, for example.

The method of manufacturing the energy storage device 10 according to this embodiment is a method of manufacturing the energy storage device 10 including: the electrode assembly 400 which is formed by winding the electrode plates (410, 420) and the separators (430, 450) around the winding axis W; and the current collectors 120 which are bonded to the electrode assembly 400, wherein the method includes the steps of: winding the electrode plates (410, 420) and the separators (430, 450); and bonding the electrode assembly 400 and the current collectors 120 to each other while pressing the end portion of the negative electrode plate 420 on an innermost periphery 401 side in the wound electrode plates (410, 420) and the separators (430, 450) using the jig 500 from an innermost periphery 401 side.

According to this manufacturing method, the electrode assembly 400 is bonded to the current collector 120 in a state where floating of the separator 450 outside the end portion of the negative electrode 420 is suppressed. Accordingly, for example, even when a contaminant is generated due to peeling off of a portion of the active material non-coated portion 421a at the time of performing the bonding operation, a possibility that the contaminant intrudes into a gap formed between the separators 450, 430 positioned outside the end portion of the negative electrode plate 420 is low. In this manner, according to the method of manufacturing the energy storage device 10 of this embodiment, it is possible to manufacture the highly reliable energy storage device 10 including the electrode assembly 400 which is formed by winding the electrode plates (410, 420) and the separators (430, 450).

In the above-mentioned winding step, the winding start end edge 420a of the negative electrode plate 420 is disposed at the bent portion 402a or at the position in the vicinity of the bent portion 402a and hence, the end edge 420a of the negative electrode plate 420 is sandwiched between the separators 430, 450 wound by the winding device at a position distant from the end edges of the separators 430, 450.

Figure 9:
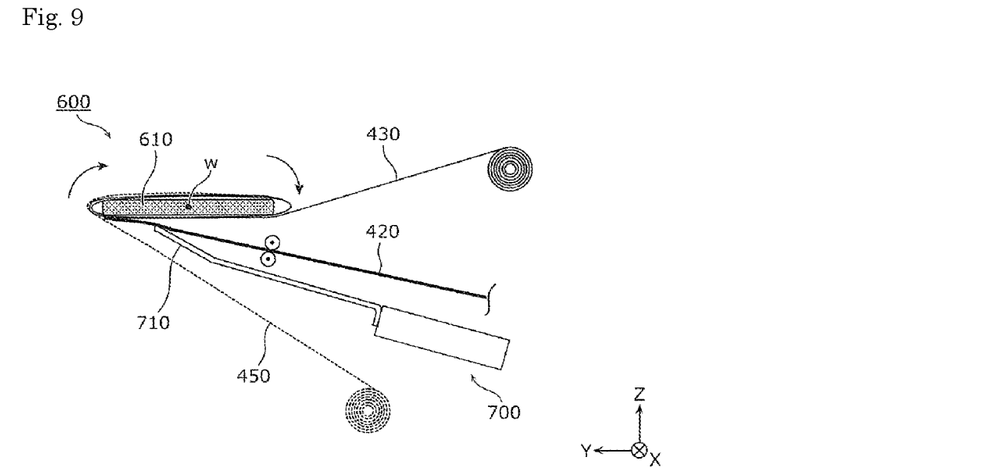
FIG. 9 is a view showing a part of a winding step at the time of manufacturing the electrode assembly according to the embodiment.

FIG. 9 is a view showing a part of the winding step at the time of manufacturing the electrode assembly 400 according to the embodiment. As shown in FIG. 9, in the winding step according to the embodiment, the winding device 600 is used. In the winding device 600, the electrode assembly elements such as the separator 430 and the like are wound by a rotator 610 which rotates about the winding axis W. To be more specific, the rotator 610 winds up the electrode assembly elements such as the separators 430 about the core member 480 (not shown in the drawing in FIG. 9) by rotating the core member 480.

In the winding step performed in this manner, when winding of the negative electrode plate 420 using the rotator 610 is started, as shown in FIG. 9, the end edge 420a of the negative electrode plate 420 is disposed at a position in the vicinity of an end portion of the rotator 610 in a longitudinal direction and where the separator 430 and the separator 450 are brought into contact with each other.

To be more specific, the end edge 420a of the negative electrode plate 420 is disposed at the position where the separator 430 and the separator 450 are brought into contact with each other while supporting the end portion including the end edge 420a of the negative electrode 420 on a guide portion 710 which a guide device 700 includes. Thereafter, the rotator 610 is rotated. With such a rotating operation, the end edge 420a of the negative electrode plate 420 is sandwiched between the separator 430 and the separator 450, and the end edge 420a of the negative electrode 420 is wound together with the separators 430, 450. As a result, the position of the end edge 420a of the negative electrode 420 in the electrode assembly 400 is at the bent portion 402a or at the position in the vicinity of the bent portion 402a as shown in FIG. 6, for example.

In the winding step, when the winding start end edge 420a of the negative electrode plate 420 is guided to an area in the vicinity of the end portion of the rotator 610 in the longitudinal direction (an end portion on a side remote from the guide device 700) as shown in FIG. 9, the guide device 700 is brought into a state where the guide device 700 is likely to interfere with the lower separator 450. Accordingly, for example, by adjusting an angle made by the separator 450 and the rotator 610 or the like, the interference between the guide device 700 and the separators 430, 450 can be prevented.

Other Embodiments

The energy storage device and the method of manufacturing the energy storage device according to the present invention have been described heretofore with reference to the embodiment. However, the present invention is not limited to the above-mentioned embodiment. The configurations acquired by applying various modifications which those who are skilled in the art conceive to the above-mentioned embodiment, and the configurations acquired by combining the plurality of constitutional elements described above also fall within the scope of the present invention unless these configurations depart from the gist of the present invention.

Figure 10:
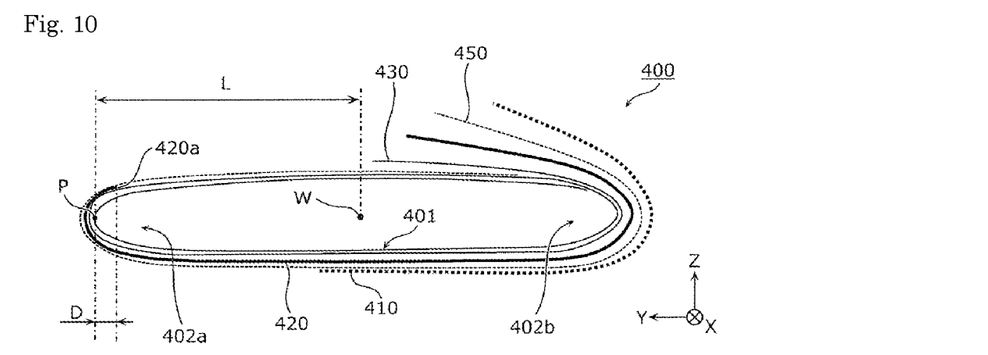
FIG. 10 is a view showing another example of a winding start position of the negative electrode plate in the electrode assembly.

For example, the position of the end edge 420a of the negative electrode plate 420 in the electrode assembly 400 is not limited to the position shown in FIG. 6 and the like. For example, as shown in FIG. 10, the position of the end edge 420a may be the position which exceeds beyond the top P of the bent portion 402a. Also in this case, the end portion including the end edge 420a of the negative electrode plate 420 exists at the position pressing the separator 450 outside the negative electrode plate 420 structurally. Accordingly, it is possible to acquire an advantageous effect of suppressing floating of the separator 450 outside the end portion including the end edge 420a of the negative electrode plate 420. This advantageous effect can be acquired also in the case where the position of the end edge 420a of the negative electrode 420 is disposed at the right bent portion 402b in FIG. 6 or at the position in the vicinity of the bent portion 402b, and in the case where the electrode assembly 400 has no core member 480, for example.

Further, with respect to the position of the end edge 420a of the negative electrode plate 420, the position at which the intrusion of a contaminant from an area in the vicinity of the end edge 420a can be suppressed can be also defined in view of the positional relationship of the end edge 420a and the bonding portion 425.

Figure 11:
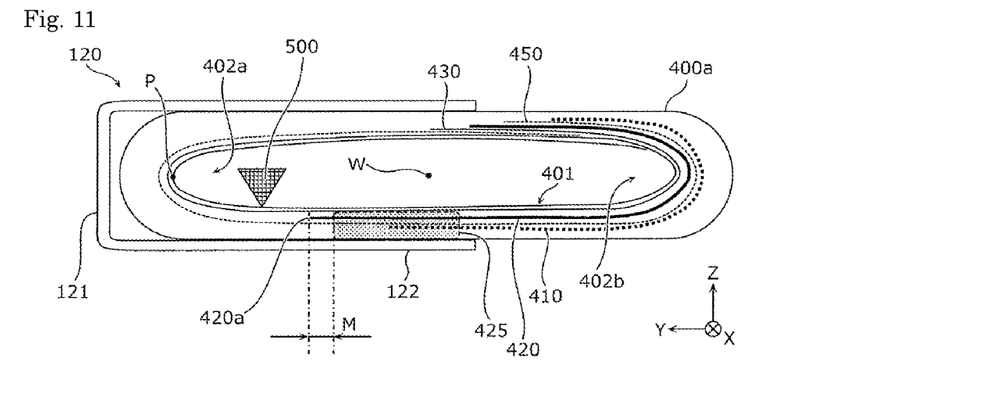
FIG. 11 is a view showing one example of a positional relationship between a winding start end edge of the negative electrode plate and the bonding portion of the electrode assembly.

FIG. 11 is a view showing one example of a positional relationship between the winding start end edge 420a of the negative electrode plate 420 and a bonding portion of the electrode assembly 400. An electrode assembly 400a shown in FIG. 11 is one example of an electrode assembly provided to the energy storage device 10 in place of the above-mentioned electrode assembly 400.

The electrode assembly 400a shown in FIG. 11 is formed by winding the plates (410, 420) and the separators (430, 450) together. A current collector 120 is bonded to the electrode assembly 400a. An innermost periphery 401 of the wound plates (410, 420) and separators (430, 450) has a flattened shape having a pair of bent portions 402a, 402b disposed on opposite sides in a first direction (Y axis direction) as viewed in a direction of the winding axis W. The electrode assembly 400a has a bonding portion 425 to be bonded to the current collector 120, and an end edge 420a of the negative electrode plate 420 on an innermost periphery 401 side is disposed between the bonding portion 425 and a top P of one bent portion (in FIG. 11, bent portion 402a) out of the pair of bent portions 402a, 402b in the first direction (Y axis direction).

In this manner, in the electrode assembly 400a shown in FIG. 11, the position of the end edge 420a of the negative electrode plate 420 on an innermost periphery 401 side in the winding-type electrode assembly 400a is at the position spaced apart from the bonding portion 425 in the Y axis direction.

That is, in the electrode assembly 400a shown in FIG. 11, the position where floating of the separator 450 is liable to occur, which is the position of the end edge 420a of the negative electrode plate 420 and the position of the bonding portion 425 where a contaminant is liable to generate are displaced from each other in the Y axis direction. With such a configuration, even when floating of the separator 450 occurs in the vicinity of the end edge 420a of the negative electrode plate 420, it is possible to reduce a possibility that a contaminant intrudes from the portion where the floating occurs. As a result, the generation of a defect (internal short-circuiting or the like) caused by contact of the contaminant with the positive electrode plate 410 can be suppressed.

In this manner, it is possible to acquire the highly reliable energy storage device 10 by also defining the position of the end edge 420a of the negative electrode plate 420 on the innermost periphery 401 side in view of the relationship with the position of the bonding portion 425.

To be more specific, the current collector 120 includes a terminal connecting portion 121 to be connected to the electrode terminal, and a leg portion 122 extending from the terminal connecting portion 121 and connected to the bonding portion 425 of the electrode assembly 400a. The end edge 420a of the negative electrode plate 420 on an innermost periphery 401 side is disposed between the bonding portion 425 and a top P of a bent portion 402a on a terminal connecting portion 121 side out of a pair of bent portions 402a, 402b in the first direction (Y axis direction).

In general, the energy storage device 10 takes a posture (for example, a posture shown in FIG. 1) where a side on which the electrode terminals (200, 300) are disposed is directed upward at the time of manufacturing and using the energy storage device 10 in many cases. When the energy storage device 10 takes such a posture, according to the above-mentioned configuration, the end edge 420a of the negative electrode plate 420 on an innermost periphery 401 side is positioned above the bonding portion 425.

To be more specific, the end edge 420a of the negative electrode 420 is directed upward, that is, the negative electrode plate 420 is wound in a direction from above to below (in a direction away from the terminal connecting portion 121) at a winding start position. In this case, floating of the separator 450 is liable to occur at the position above the end edge 420a.

Accordingly, even when floating of the separator 450 occurs in the vicinity of the end edge 420a of the negative electrode plate 420, the position is above the bonding portion 425 where a contaminant is liable to be generated. Therefore, according to the energy storage device 10 which includes the electrode assembly 400a, it is possible to reduce a possibility that a contaminant intrudes into the inside of the electrode assembly 400a.

When a plurality of portions of the electrode assembly 400a bonded to the leg portion 122 of the current collector 120 exist in a dispersed manner in the Y axis direction, an area ranging from one end to the other end in the Y axis direction of all of the plurality of portions is defined as an existing region of one bonding portion 425 in the Y axis direction.

The configuration of the above-mentioned electrode assembly 400a is useful in the case where the end edge 420a of the negative electrode plate 420 does not reach a jig 500 which is used in bonding the electrode assembly 400 and the current collector 120 to each other as shown in FIG. 11. That is, even when the end edge 420a of the negative electrode 420 cannot be pressed firmly by the jig 500, by positioning the end edge 420a of the negative electrode plate 420 away from the bonding portion 425 in the Y axis direction, it is possible to acquire an advantageous effect of suppressing intrusion of a contaminant into the inside of the electrode assembly 400a.

To be more specific, inventors of the present invention performed a test for checking the number of intruded contaminants in the vicinity of the end edge 420a while changing a distance between the end edge 420a of the negative electrode 420 and the bonding portion 425. The result of the test showed that when the distance is equal to or more than 2 mm, substantially no contaminants intrude into the inside of the electrode assembly 400a.

That is, it is preferable that a projecting distance M (see FIG. 11) which is a distance from a portion of the negative electrode plate 420 bonded to the current collector 120 at the bonding portion 425 to the end edge 420a in the Y axis direction be set to 2 mm or more.

That is, by positioning the winding start end edge 420a of the negative electrode plate 420 within such a range, it is possible to acquire with more certainty an effect of suppressing intrusion of a contaminant in the vicinity of the end edge 420a of the negative electrode plate 420.

In the electrode assembly 400a, assume the case where the end edge 420a of the negative electrode plate 420 is directed downward, that is, the case where the negative electrode 420 is wound from below to above (in a direction approaching the terminal connecting portion 121) at a winding start position. In this case, a winding start end edge of the positive electrode plate 410 exists at the position above the end edge 420a of the negative electrode plate 420 or at the position beyond a top of a bent portion of an innermost periphery 401 disposed above the end edge 420a of the negative electrode plate 420. Accordingly, even when a contaminant intrudes into the inside of the electrode assembly 400a from an area in the vicinity of the end edge 420a of the negative electrode plate 420, the contaminant minimally reaches the positive electrode plate 410.

Accordingly, the configuration shown in FIG. 11 where the position of the end edge 420a of the negative electrode plate 420 is spaced apart from the bonding portion 425 in the Y axis direction is useful in the case where the negative electrode plate 420 is wound from above to below (in a direction away from the terminal connecting portion 121) on a side of the electrode assembly 400 where the bonding portion 425 exists. That is, in this case, by making the position of the end edge 420a of the negative electrode plate 420 remote from the bonding portion 425 in the Y axis direction, it is possible to acquire an effect of suppressing the generation of minute short-circuiting and the like attributed to a contaminant which intrudes from an area in the vicinity of the end edge 420a.

In this embodiment, the energy storage device 10 is configured to include only one electrode assembly 400. However, the number of electrode assemblies 400 which the energy storage device 10 includes may be set to two or more. For example, when the energy storage device 10 includes two electrode assemblies 400, the current collector 120 may have four leg portions 122 to be bonded to two electrode assemblies 400.

The number of leg portions 122 which the current collector 120 has is not limited to two. It is sufficient that the current collector 120 have at least one leg portion 122 to be bonded to the negative electrode side end portion of the electrode assembly 400.

The configurations obtained by arbitrary combining the configurations described in the above-mentioned embodiment also fall within the scope of the present invention.

The present invention can be realized not only as the above-described energy storage device, but also as the electrode assembly 400 which the energy storage device includes. The present invention can be realized also as an energy storage apparatus which includes a plurality of the energy storage devices.

INDUSTRIAL APPLICABILITY

The present invention is applicable to an energy storage device and the like such as a lithium ion secondary battery.

DESCRIPTION OF REFERENCE SIGNS

10: energy storage device
100: case
110: lid body
111: body
120, 130: current collector
120a, 130a: welded mark
121: terminal connecting portion
121a: through hole 122: leg portion
200: negative electrode terminal
300: positive electrode terminal
400, 400a: electrode assembly
401: innermost periphery
402a, 402b: bent portion
410: positive electrode plate
410a, 420a: end edge
411: positive electrode base substrate layer
411a, 421a: active material non-coated portion
414: positive electrode composite material layer
420: negative electrode plate
421: negative electrode substrate layer
424: negative electrode composite material layer
425: bonding portion
430, 450: separator
480: core member
500: jig
600: winding device
610: rotator
700: guide device
710: guide portion

The invention claimed is:

1. An energy storage device, comprising:
an electrode assembly including a plate and a separator, the electrode assembly being formed by winding the plate and the separator around a winding axis;
a current collector which is bonded to the electrode assembly,
wherein an innermost periphery of the plate and the separator, which are wound together, has a flattened shape including a pair of bent portions disposed on opposite sides in a first direction as viewed in a direction of the winding axis, and
wherein the electrode assembly includes a bonding portion which forms a portion to be bonded to the current collector; and
an electrode terminal,
wherein the current collector includes a terminal connecting portion to be connected to the electrode terminal, and a leg portion extending from the terminal connecting portion and connected to the bonding portion of the electrode assembly,
wherein an end edge of the plate on an innermost peripheral side is disposed between the bonding portion and a top of one bent portion of the pair of bent portions on a terminal connecting portion side of the pair of bent portions in the first direction as viewed in a second direction in which a pair of the flattened shapes sandwiches the winding axis,
wherein the flattened shape includes a flat portion extending between the pair of bent portions, and
wherein a portion of the plate, which includes the end edge of the plate and extends in the flat portion between an edge of the bonding portion and the one bent portion, is exposed out of the bonding portion.

2. The energy storage device according to claim 1, wherein, assuming that a distance from the winding axis to the top of the bent portion in the first direction is L, the end edge of the plate is disposed within a range of L/4 from the top of the bent portion in the first direction.

3. The energy storage device according to claim 1, wherein the portion of the bonding portion is bonded to the leg portion, and
wherein the end edge of the plate is disposed at a position closer to the top of the bent portion than the bonding portion in the first direction.

4. The energy storage device according to claim 1, wherein the electrode assembly further includes a core member disposed in contact with the innermost periphery and having a flattened shape.

5. The energy storage device according to claim 1, wherein the plate comprises a negative electrode plate,
wherein the electrode assembly further includes a positive electrode plate wound together with the negative electrode plate and the separator,
wherein, assuming that a distance from the winding axis to the top of the bent portion in the first direction is L, the end edge of the negative electrode plate is disposed at a position closer to the top of the bent portion in the first direction than an end edge of the positive electrode plate on the innermost peripheral side, and
wherein a distance between the end edge of the negative electrode plate and the end edge of the positive electrode plate is set to L/2 or more.

6. The energy storage device according to claim 1, wherein a distance between the winding axis and the end edge of the plate is more than a distance between the winding axis and a boundary between the one bent portion and the flat portion.

7. The energy storage device according to claim 1, wherein the top of the bent portion is located on the innermost periphery and is exposed to the winding axis.

8. The energy storage device according to claim 1, wherein the end edge of the plate on the innermost peripheral side extends further than a boundary between the one bent portion and the flat portion, and penetrates into the one bent portion.

9. An energy storage device, comprising:
an electrode assembly including a plate and a separator, the electrode assembly being formed by winding the plate and the separator around a winding axis;
a current collector which is bonded to the electrode assembly,
wherein an innermost periphery of the plate and the separator, which are wound together, has a flattened shape including a pair of bent portions disposed on opposite sides in a first direction as viewed in a direction of the winding axis, and
wherein the electrode assembly includes a bonding portion which forms a portion to be bonded to the current collector,
wherein the plate comprises a negative electrode plate,
wherein the electrode assembly further includes a positive electrode plate wound together with the negative electrode plate and the separator,
wherein, assuming that a distance from the winding axis to a top of the bent portion in the first direction is L, the end edge of the negative electrode plate is disposed at a position closer to the top of the bent portion in the first direction than an end edge of the positive electrode plate on the innermost peripheral side, and
wherein a distance between the end edge of the negative electrode plate and the end edge of the positive electrode plate is set to L/2 or more; and
an electrode terminal,
wherein the current collector includes a terminal connecting portion to be connected to the electrode terminal, and a leg portion extending from the terminal connecting portion and connected to the bonding portion of the electrode assembly,
wherein an end edge of the negative electrode plate on an innermost peripheral side is disposed between the bonding portion and a top of one bent portion of the pair of bent portions on a terminal connecting portion side of the pair of bent portions in the first direction,
wherein the flattened shape includes a flat portion extending between the pair of bent portions, and
wherein a portion of the plate, which includes the end edge of the negative electrode plate and extends in the flat portion between an edge of the bonding portion and the one bent portion, is exposed out of the bonding portion.

10. The energy storage device according to claim 9, wherein a distance between the winding axis and the end edge of the negative electrode plate is more than a distance between the winding axis and a boundary between the one bent portion and the flat portion.

11. The energy storage device according to claim 9, wherein the top of the bent portion is located on the innermost periphery and is exposed to the winding axis.

12. The energy storage device according to claim 9, wherein the end edge of the negative electrode plate on the innermost peripheral side extends further than a boundary between the one bent portion and the flat portion, and penetrates into the one bent portion.

* * * * *